United States Patent [19]
Barnett

[11] 3,771,810
[45] Nov. 13, 1973

[54] HARNESS RACING SULKY

[76] Inventor: Ray V. Barnett, P.O. Box 104, Kahlotus, Wash.

[22] Filed: Oct. 22, 1971

[21] Appl. No.: 191,707

[52] U.S. Cl. .................................. 280/63, 296/31 P
[51] Int. Cl. ............................................... B62c 1/08
[58] Field of Search ...................... 280/63; 296/31 P

[56] References Cited
UNITED STATES PATENTS

| | | | |
|---|---|---|---|
| 3,415,533 | 12/1968 | Bliss | 280/63 |
| 3,549,165 | 12/1970 | Zuhlke | 296/31 P |
| 3,163,438 | 12/1964 | Bliss | 280/63 |
| 3,173,706 | 3/1965 | Britten | 280/63 |
| 3,256,125 | 6/1966 | Tyler | 296/31 P |

*Primary Examiner*—Robert R. Song
*Attorney*—Robert H. Ware et al.

[57] ABSTRACT

A horse cart or harness racing sulky comprises a fiber filled thermosetting resin (fiberglass) shell which partially encapsulates a U-shaped trussed bridge formed of metal tubing which has two wheels mounted on the downwardly depending legs thereof, and joins therewith bracing struts also formed of metal tubing extending upward from the wheel hubs to the fiberglass shell for partial encapsulation therein, and horse-flanking shafts protruding forwardly from the vicinity of the U-shaped trussed bridge. The fiberglass shell is preferably fabricated with bright colored or glistening metallic flake pigments, and has a gently arched top portion curving downward along its periphery into downwardly depending flanges and wheel pants. The combination of the fiberglass shell and the partially encapsulated U-shaped trussed bridge, braces, and horse flanking shafts comprise an extremely strong, lightweight, safe, weatherproof, rigid, unitary sulky having a graceful and aesthetically pleasing appearance.

The sulky further comprises stirrups adjustably mounted on the shafts, a seat mounted centrally above the U-shaped trussed bridge, and conventional harness anchorage means.

4 Claims, 6 Drawing Figures

INVENTOR
RAY V. BARNETT

BY

MATTERN WARE AND DAVIS
ATTORNEYS 3,771,810

HARNESS RACING SULKY

BACKGROUND OF THE INVENTION

This invention relates to two wheeled horse carts, and more particularly to a two wheeled horse cart fabricated of metal tubing embedded in a fiberglass shell to form a strong, lightweight racing sulky.

The requirements for a serviceable harness racing sulky are many. It must be lightweight and streamlined, yet extremely strong. It should be weather resistant, and be capable of accommodating riders of various sizes. It should not break into pieces in the event of an accident wherein loose pieces, particularly broken portions of the shafts, may spear either drivers or horses causing severe injury.

Prior art racing sulkies have not met these requirements. Prior art sulkies generally comprise a metal U-shaped tubular axle member having the wheels mounted therein. A wooden U-shaped member is mounted perpendicularly to the axle, wherein the legs of the U comprise wooden shafts extending forwardly of the axle and flanking the horse. A metal "trailing arm" brace extends from a point on each shaft to the hub of the trailing wheel to maintain the shafts and axles assemblies in perpendicular relationship. Other structural braces and trim parts are generally fabricated of wood.

The wood requires frequent maintenance, such as varnishing and the like, to enable the sulky to stand up under the adverse weather conditions to which it is often exposed. The U-shaped axle and U-shaped wooden member comprising the forwardly extending shafts are attached to each other at a discrete number of points, usually three. Further, the wooden member often breaks when the sulky is involved in a collision, creating a loose wooden shaft with a splintered end which may spear and severly injure horses and drivers.

SUMMARY OF THE INVENTION

The racing sulky according to this invention overcomes the disadvantages of the prior art by providing a metal U-shaped bridge having the wheels mounted thereon, forwardly extending metal shafts, and a compound curved fiberglass shell encapsulating the tubular metal parts thereby forming a unitary, strong, lightweight, weather resistant sulky.

Accordingly, it is a principal object of this invention to provide an improved two wheel horse cart.

It is another object of the invention to provide a two wheeled horse cart which is suitable for use as a harness racing sulky.

It is an additional object of the invention to provide a harness racing sulky which is lightweight and durable.

It is a further object of the invention to provide a harness racing sulky having a tough, durable, filled resin shell having a graceful, pleasing form and bright colorful appearance.

It is yet another object of the invention to provide a harness racing sulky which maintains its integrity in the event of collisions, accidents or the like.

It is still another object of the invention to provide a harness racing sulky which is weather resistant and requires no maintenance.

Other and more specific objects will be apparent from the features, elements, combinations and operating procedures disclosed in the following description of the preferred embodiment, and shown in the drawings.

THE DRAWINGS

PREFERRED EMBODIMENT

Figure 1:
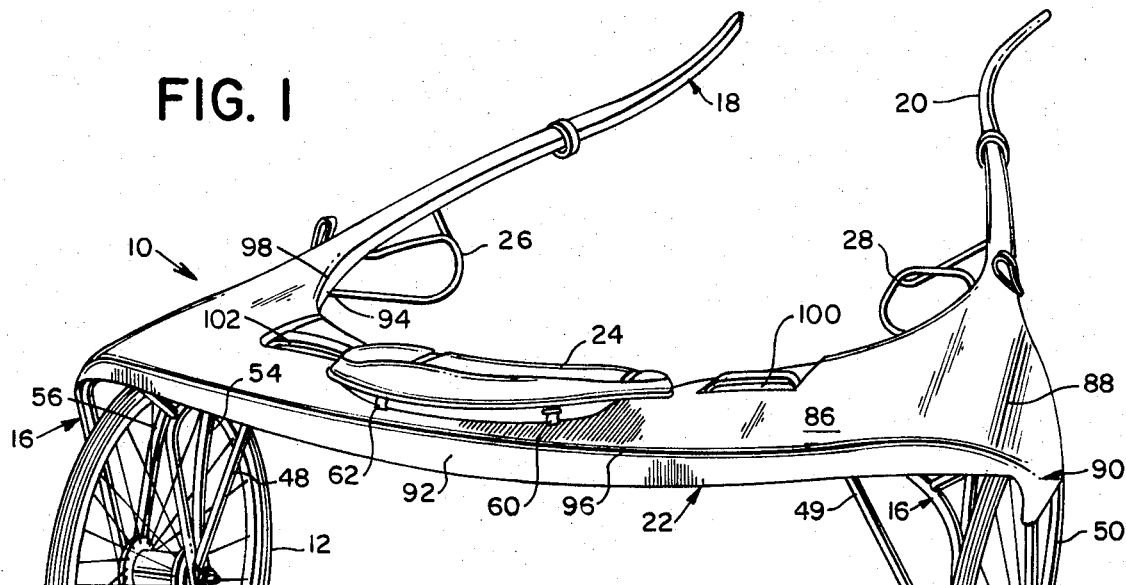
FIG. 1 is a rear perspective view of a harness racing sulky according to the invention.

Referring now to FIG. 1, there is shown a harness racing sulky 10 according to the preferred embodiment of the invention. The sulky 10 comprises generally two spoked wheels 12 and 14 mounted in the legs of a U-shaped trussed bridge 16 and associated bracing struts, two forwardly projecting horse flanking shafts 18 and 20, and a fiberglass shell 22 which envelops, encapsulates, and joins the trussed bridge 16 and shafts 18 and 20. The sulky further comprises a seat 24, position-adjustable stirrups 26 and 28, and miscellaneous hardware for attaching harness gear for connecting the horse and the sulky.

Figure 2:
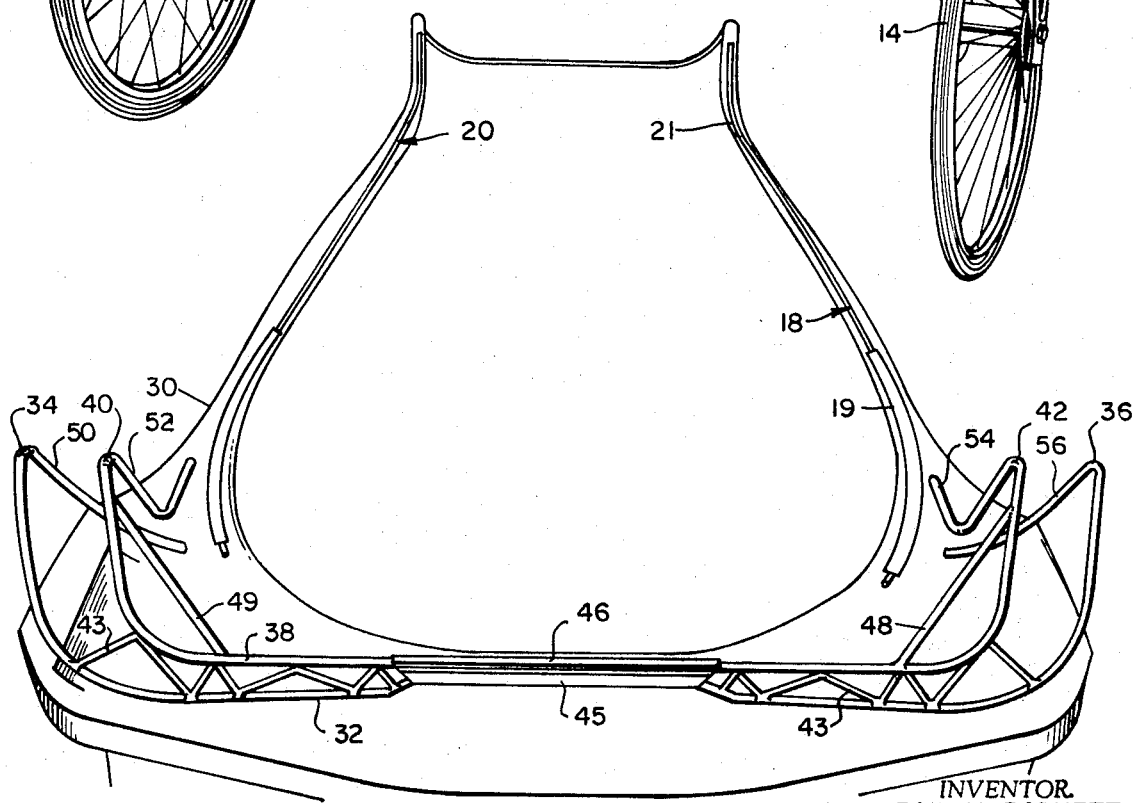
FIG. 2 is a perspective view of the mold for constructing the sulky of FIG. 1, with the tubular metal parts of the sulky positioned in the mold.

Referring now to FIG. 2, the various metal parts of the sulky 10, including the trussed bridge with its associated bracing struts and metal shafts 18 and 20, are shown positioned in mold 30 prior to "laying-up" the fiberglass shell 22 encapsulating and joining the metal parts. The U-shaped trussed bridge 16 comprises a first outside U-shaped tubular member 32 beginning at an outboard wheel mounting point 34 and extending upward along the side of the sulky, then bending to run laterally across the width of the sulky under the seat 24, and thereafter turning downward to a second outboard wheel mounting point 36. The trussed bridge 16 further comprises a second inside U-shaped tubular member 38 which extends from a first inboard wheel mounting point 40 adjacent to wheel mounting point 34 upward to a point near the top of the sulky, turns therefrom and laterally traverses the width of the sulky generally parallel to and below the first U-shaped tubular member 32, and thereafter extends downward to a second inboard wheel mounting point 42 adjacent to wheel mounting hole 36. First and second tubular members 32 and 38 are joined by tubular braces 43 zigzagging therebetween, which braces are welded at their ends to the tubular members 32 and 38 as shown. Directly under seat 24 the tubular members 32 and 38 are further joined by two metal plates 45 and 46 which "sandwich" the tubular members and are attached thereto by rivets 47. The trussed bridge 16 is further strengthened by struts 48 and 49 which aid in maintaining the desired U-shaped configuration of the inside tubular member 32.

Forward of the U-shaped trussed bridge 16 are struts for linking the wheel mounting points with the fiberglass shell. These struts comprise an outside strut 50 extending from wheel attachment point 34 upward and forward to clear wheel 14, whereafter strut 50 curves inwardly in mating configuration with shell 22. A second inside strut 52 extends upward and forward from wheel attachment point 40 to the shell 22, also curving into mating configuration therewith. Struts 54 and 56 located on the other side of the sulky are similar.

Referring again to FIG. 2, the reinforcing parts of the sulky further comprise two shafts 18 and 20 incorporating reinforcing members, which may be flat metal bars or hollow metal tubes. Each shaft has a gentle "S" curvature. A portion 19 of shaft 18 is preferably rectangular, and lies adjacent to the inside peripheral edge of shell 22. The remaining forwardly protruding portion 21 of shaft 18 is tubular. Shaft 20 is similar to shaft 18.

Figure 3:
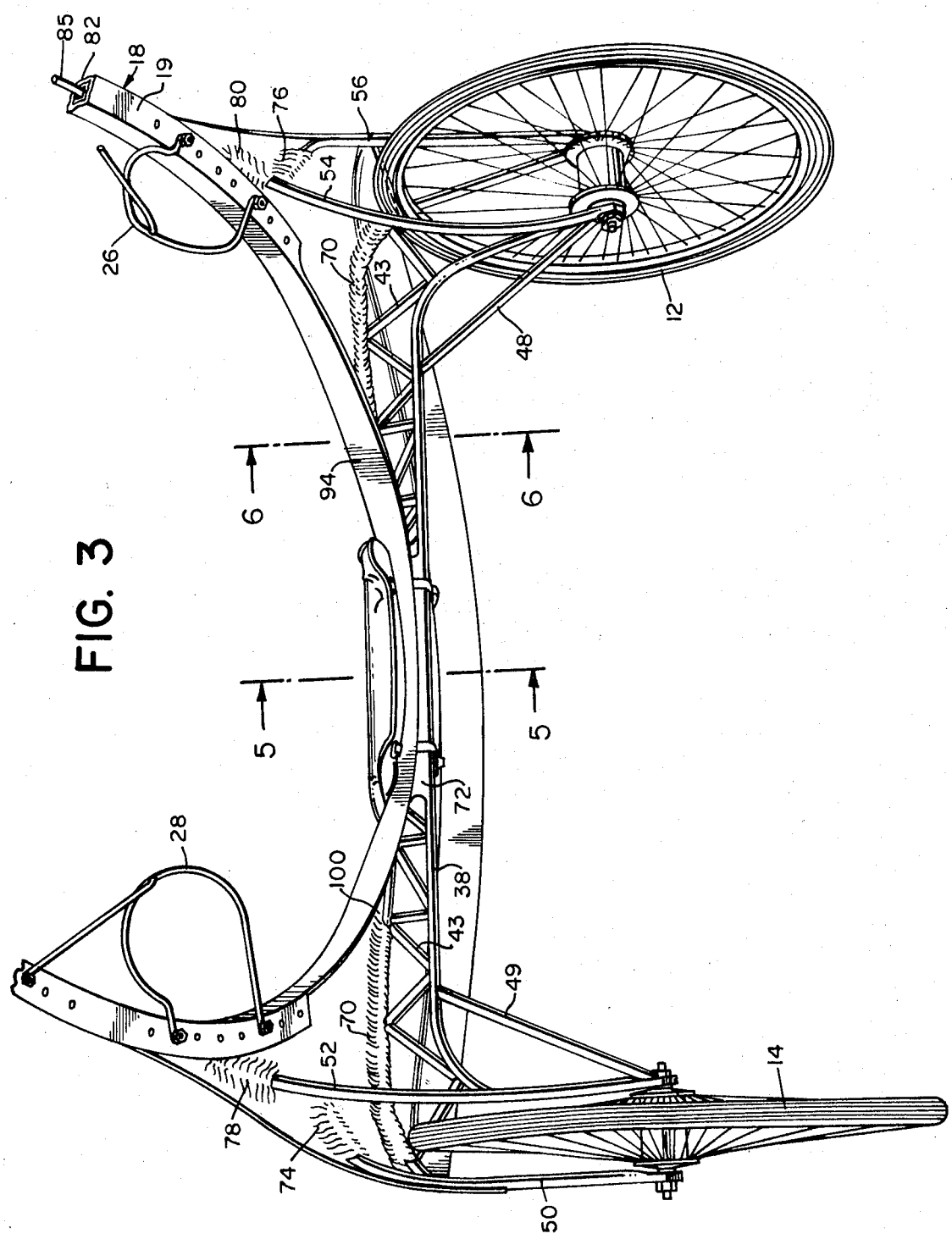
FIG. 3 is a perspective view of the underside of the sulky of FIG. 1.
Figure 4:
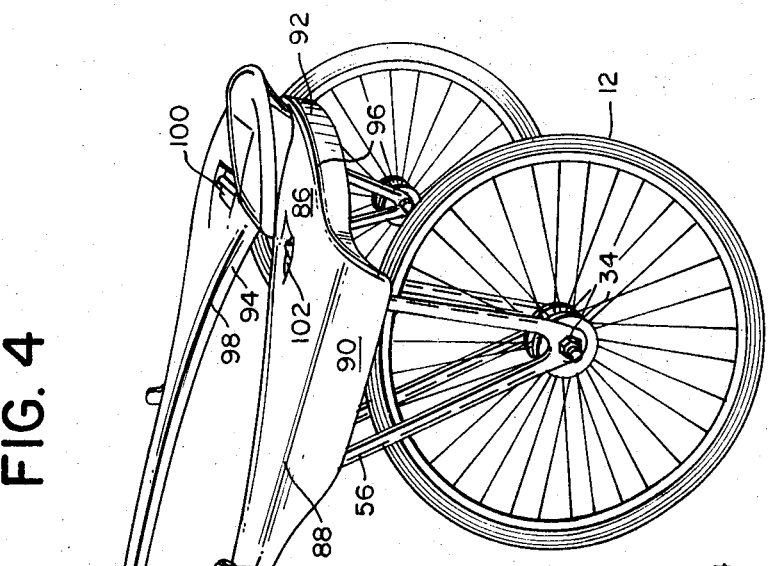
FIG. 4 is a side perspective view of the sulky of FIG. 1.

The tubular members are preferably fabricated of lightweight aluminum, except for outside strut 56 on the left side of the sulky as seen in FIGS. 3 and 4. Strut 56 is tempered aluminum tubing of a heavier gauge, to better withstand bumping and rubbing against the inside rail of a race course.

Construction of the sulky is accomplished by first laying up a thin top portion of fiberglass shell 22 in mold 30. The metal parts, including those comprising the U-shaped trussed bridge 16, the struts 50–56, and shafts 18 and 20 are then placed on the partially formed shell in the positions shown in FIG. 2. The remainder of the shell is then laid up, encapsulating portions of the metal parts, wherein a unitary sulky frame is achieved.

Referring now to FIG. 3, it can be seen which portions of the metal parts are encapsulated by the shell 22. The outside tubular member 32 of the U-shaped trussed bridge 16 is encapsulated at 70 along the entire lateral width of the shell 22, the encapsulation beginning at approximately the top of wheel 14 and extending to approximately the top of wheel 12. Directly under seat 24 the encapsulation 70 is extended downward at 72 to enclose a central portion of the lower tubular member 38 and the metal plates 45 and 46.

The upper portion of strut 50 is encapsulated in fiberglass shell 22 at 74, and the upper end of strut 56 is similarly encapsulated at 76. The upper portions of struts 52 and 54 are also enveloped by the fiberglass shell 22, as indicated at 78 and 80. The rectangular end portion 19 of shaft 18 is covered around its sides and top by the fiberglass shell 22 at 82, leaving the bottom surface of the shaft exposed, and the forward extending tubular portion 21 of shaft 18 is fully encapsulated in fiberglass shell 22 at 84 (See FIG. 4). The shaft 20 is similarly encapsulated to become a portion of the unitary sulky.

The metal reinforced fiberglass shafts 18 and 20 provide a distinct advantage over prior art sulkies. In the event of a collision or other accident, the reinforcing metal tubes or bars may be bent, but resist breaking into two or more pieces. Prior art sulkies with wooden shafts tended to break up in such a manner, and the pieces often "spear" a horse or driver causing severe injury. The liklihood of such injury is thereby greatly reduced by the sulky according to this invention. A steel cable 85 is provided inside each shaft and anchored at both ends thereof for added protection against the shaft breaking into two pieces.

The fiberglass shell 22 has a slightly arched top portion 86 extending the lateral width of the sulky. The ends of the fiberglass shell further curve downward at 88 from its top portion 86 to form abbreviated, downwardly depending wheel parts 90 over the wheel 12 and 14. Along the front and back of the shell are downwardly depending flanges 92 and 94 joined with the top surface 86 of the sulky at sharp radii of curvature 96 and 98, as shown in FIGS. 1, 3, 5 and 6. This continuously curved body shell further enhances the safety of this unitary sulky; in case the driver becomes unseated, he will not put his hand into a network of open archwork and stiffeners as in the case of the wooden-arched sulkies. Instead, he would fall onto or put his hand out onto a safe, flat, curved surface.

The fiberglass shell 22 therefore has a generally C-shaped vertical section generally comprising the top portion 86 and the depending flanges 92 and 94 or wheel pants 90. This cross section in and of itself provides fiberglass shell 22 with a great deal of strength, and combined with the encapsulated trussed bridge 16 and the associated braces an extremely strong, lightweight unitary sulky 10 is achieved.

Figure 6:
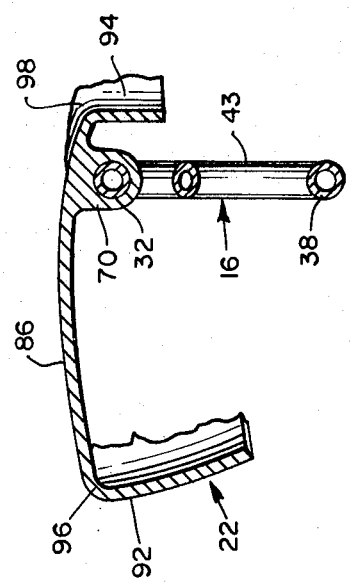
FIG. 6 is a cross sectional view of the sulky taken along the lines 6—6 of FIG. 3.
Figure 5:
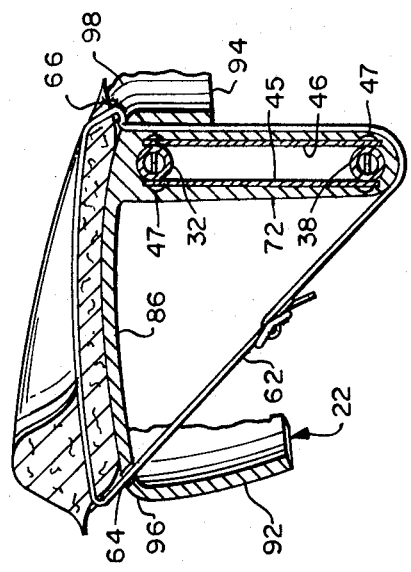
FIG. 5 is a cross sectional view of the sulky taken along the lines 5—5 of FIG. 3.

Typical details of the combined structure of the metal tubular members and fiberglass shell are shown in FIG. 5 and FIG. 6. Referring first to FIG. 5, the two tubes 32 and 38 comprising the trussed bridge 16 and the metal plates 45–46 sandwiching them are shown encapsulated by the fiberglass shell 22 at 72. The C-shaped vertical section of the fiberglass shell 22 is evident along the central portions of the sulky, wherein the fiberglass shell 22 functions as a reinforcing lateral beam providing strength across the width of the sulky. This configuration of the fiberglass shell permits the use of lightweight, light gauged tubular members without sacrifice of strength, and with substantial savings in weight wherein the sulky is a competitive in racing against prior art sulkies.

Referring now to FIG. 6, the C-shaped configuration of a verticl section of the fiberglass shell 22 comprising the gently arched top surface 86 and the downwardly depending flanges 92 and 94 are again apparent. The upper tubular member 32 of the trussed bridge 16 is encapsulated in the shell 22 at 70, wherein both the tubular member and the shell 22 contribute to the strength of the sulky as described above.

The sulky construction is completed by mounting the axles of spoked wheels of 12 and 14 through apertures in wheel mounting points 34 and 40, and 36 and 42. Portions of tubular members 32 and 38 comprising the trussed bridge 16 together with struts 50–56 and the fiberglass shell 22 form triangular supports as is best seen in FIG. 4. Seat 24 is removably attached to the shell by passing seat straps 60 and 62 through slots 64 and 66 formed in the shell 22, as can be seen in FIG. 5. The seat preferably comprises a vinyl or leather covered foam pad. Stirrups 26 and 28 are adjustably mounted along the undersides of the rectangular portions of metal reinforcing piece 19, which is preferably an aluminum flat bar, and which is an integral part of shafts 18 and 20. The stirrups are formed in the normal and usual manner, which comprises providing a plurality of spaced holes for engaging the stirrups in various positions along piece 19 (See FIG. 3).

The fiberglass shell 22 is further provided with two openings 100 and 102 flanking the seat 24 wherein starting gate apparatus may engage the sulky. The sulky is completed by mounting various eye bolts, straps, and the like, for attaching a harness connecting the sulky to the horse.

Accordingly, the sulky disclosed above achieves a significant advance in the art of harness racing sulkies. It is sufficiently light to be successfully competitive in racing, and is extremely strong, weather resistant, durable, and safe. The sulky further has a streamlined, aesthetically pleasing shape to enhance its structural advantages.

Since the foregoing description and drawings are merely illustrative, the scope of the invention has been broadly stated herein and it should be liberally interpreted to secure the benefit of all equivalents to which the invention is fairly entitled.

I claim:
1. A harness racing sulky comprising:
  A. a U-shaped truss bridge wheel support frame having a transverse bridge portion terminating at each end in two downwardly depending wheel support portions and comprising
    1. a first U-shaped frame member having a transverse bridge portion and two downwardly depending wheel support portions terminating in axle mounting means for the outsides of the two wheels;
    2. a second U-shaped frame member having a transverse bridge portion positioned below the transverse bridge portion of the first frame member and having two downwardly depending wheel support portions terminating in axle mounting means for the insides of the two wheels, wherein the axles of the two wheels are respectively mounted in adjacent outside and inside axle mounting means to span the width therebetween; and
    3. cross braces extending between and joining the transverse bridge portions of the first and second U-shaped frame members;
  B. two spaced apart sulky wheels rotatably mounted at the ends of the two depending wheel support portions of the U-shaped wheel support frame;
  C. two forwardly protruding horse-flanking shafts; and
  D. a fiber filled upwardly arched thermosetting resin shell embeddingly encapsulating at least a portion of the second U-shaped frame member and substantially the entire first U-shaped frame member forming the outer peripheral portion of the U-shaped wheel support frame, and at least a portion of each of the two forwardly protruding horse-flanking shafts, whereby the U-shaped wheel support frame and the two forwardly protruding horse-flanking shafts are joined together into a one-piece unitary sulky.

2. A harness racing sulky as defined in claim 1 wherein the resin filled shell comprises a gently arched top portion disposed generally horizontally along the width of the sulky with the transverse portion of the first U-shaped frame member of the trussed bridge encapsulated immediately therebelow, said gently arched top portion curving forward at its peripheral edges into two integral downwardly depending flanges flanking the transverse portion of the U-shaped trussed bridge.

3. A harness racing sulky as defined in claim 2 wherein the filled resin shell engages and encapsulates each of the two forwardly protruding horse flanking-shafts along their entire lengths.

4. A two-wheeled harness racing sulky comprising:
  A. a U-shaped wheel support frame having a transverse truss bridge portion terminating at each end in two downwardly depending wheel support portions and having
    1. a first U-shaped frame member having a transverse bridge portion and two downwardly depending wheel support portions terminating in axle mounting means for the outsides of the two wheels;
    2. a second U-shaped frame member having a transverse bridge portion positioned below the transverse bridge portion of the first frame member and having two downwardly depending wheel supporting portions terminating in axle mounting means for the insides of the two wheels, wherein the axles of the two wheels are respectively mounted in adjacent outside and inside axle mounting means to span the width therebetween; and
    3. cross braces extending between and joining the transverse bridge portions of the first and second U-shaped frame members.
  B. two spaced apart sulky wheels rotatably mounted respectively on said axles;
  C. two forwardly protruding horse-flanking shafts;
  D. a fiber-filled thermosetting resin shell encapsulating the first U-shaped frame member along its transverse bridge portion and further encapsulating at least a portion of the second lower U-shaped frame member and at least a portion of each of the two forwardly protruding horse-flanking shafts, whereby the U-shaped wheel support frame and the two forwardly protruding horse-flanking shafts are joined together into a one-piece unitary sulky;
  E. a seat centrally positioned between the two wheels on a gently arched top surface portion of the filled resin shell; and
  F. means forming two openings in the filled resin shell flanking the seat wherein gate apparatus for the horse may engage the sulky.

* * * * *